(12) United States Patent
Bijral et al.

(10) Patent No.: US 12,315,010 B2
(45) Date of Patent: May 27, 2025

(54) MACHINE LEARNING-BASED TEMPORAL STARTUP PREDICTIVE SYSTEM

(71) Applicant: Microsoft Technology Licensing, LLC, Redmond, WA (US)

(72) Inventors: Avleen Singh Bijral, Bozeman, MT (US); Lee Eric Feldman, Seattle, WA (US); Samir Kumar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 60 days.

(21) Appl. No.: 17/828,386

(22) Filed: May 31, 2022

(65) Prior Publication Data
US 2023/0410205 A1 Dec. 21, 2023

(51) Int. Cl.
G06Q 40/00 (2023.01)
G06N 5/022 (2023.01)
G06Q 40/06 (2012.01)

(52) U.S. Cl.
CPC ............. *G06Q 40/06* (2013.01); *G06N 5/022* (2013.01)

(58) Field of Classification Search
CPC ......... G06Q 40/00; G06Q 40/06; G06N 5/022
See application file for complete search history.

(56) References Cited

U.S. PATENT DOCUMENTS

| | | | |
|---|---|---|---|
| 10,929,815 B2 * | 2/2021 | Martin | G06N 20/00 |
| 11,232,383 B1 * | 1/2022 | Burns, Sr. | G06Q 10/0637 |
| 2019/0385100 A1 * | 12/2019 | Zaman | G06F 17/16 |

(Continued)

FOREIGN PATENT DOCUMENTS

| | | |
|---|---|---|
| CA | 2878590 A1 | 7/2015 |
| CA | 3148040 A1 | 1/2021 |
| GB | 2570600 B | 12/2019 |

OTHER PUBLICATIONS

[HTML] CapitalVX: A machine learning model for startup selection and exit prediction G Ross, S Das, D Sciro, H Raza—The Journal of Finance and Data Science, 2021—Elsevier (Year: 2021).*

(Continued)

*Primary Examiner* — Lalita M Hamilton
(74) *Attorney, Agent, or Firm* — Schwegman Lundberg & Woessner, P.A.

(57) ABSTRACT

Systems and methods are directed to predicting temporal startup measurements using a machine-trained model. The system determines a training dataset of features associated with different funding, exit, and closure events and corresponding times of the funding, exit, and closure events from historical financial data. A temporal prediction model is trained using the training dataset. The temporal prediction model can comprise a recurrent neural network (e.g., gated recurrent unit). During runtime, the system accesses new data associated with potential future investment opportunities with startups and determines (e.g., compute) company features based, in part, on the new data. The system applies the company features to the temporal prediction model to simultaneously predict a next event and a time of the next event for each startup. A user interface can then be presented that shows the predicted next event and the predicted time of the predicted next event for each startup.

18 Claims, 6 Drawing Sheets

(56) References Cited

U.S. PATENT DOCUMENTS

2021/0319306 A1  10/2021  Leite Pinheiro De Paiva et al.
2022/0043433 A1   2/2022  Chao et al.

OTHER PUBLICATIONS

"Gartner", Retrieved from: http://web.archive.org/web/20200108224832/https://www.wsj.com/market-data/quotes/IT, Jan. 8, 2020, 4 Pages.

"M12 | Microsoft's Venture Fund", Retrieved from: http://web.archive.org/web/20211224002919/https:/m12.vc/, Dec. 24, 2021, 8 Pages.

Council, Jared, "VC Firms Have Long Backed AI. Now, They Are Using It", Retrieved from: https://www.wsj.com/articles/vc-firms-have-long-backed-ai-now-they-are-using-it-11616670000?mod=Searchresults_pos14&page=7, Mar. 25, 2021, 4 Pages.

Du, et al., "Recurrent Marked Temporal Point Processes: Embedding Event History to Vector", In Proceedings of the 22nd ACM SIGKDD International Conference on Knowledge Discovery and Data Mining, Aug. 13, 2016, 10 Pages.

Sharchilev, et al., "Web-Based Startup Success Prediction", In Proceedings of the 27th ACM International Conference on Information and Knowledge Management, Oct. 22, 2018, pp. 2283-2291.

Perboli, et al., "A Machine Learning-based DSS for Mid and Long-Term Company Crisis Prediction", In Journal of Expert Systems with Applications, vol. 174, Jul. 15, 2021, 12 Pages.

* cited by examiner

MACHINE LEARNING-BASED TEMPORAL STARTUP PREDICTIVE SYSTEM

TECHNICAL FIELD

The subject matter disclosed herein generally relates to startup event predictions. Specifically, the present disclosure addresses systems and methods that predict temporal startup measurements using machine-learning.

BACKGROUND

Conventional models and processes for making venture capital decisions are largely manual and mostly subjective. Data that may indicate success is gathered but decision makers still rely on intuition to guess what a company's success timeline would look like.

DETAILED DESCRIPTION

Figure 1:
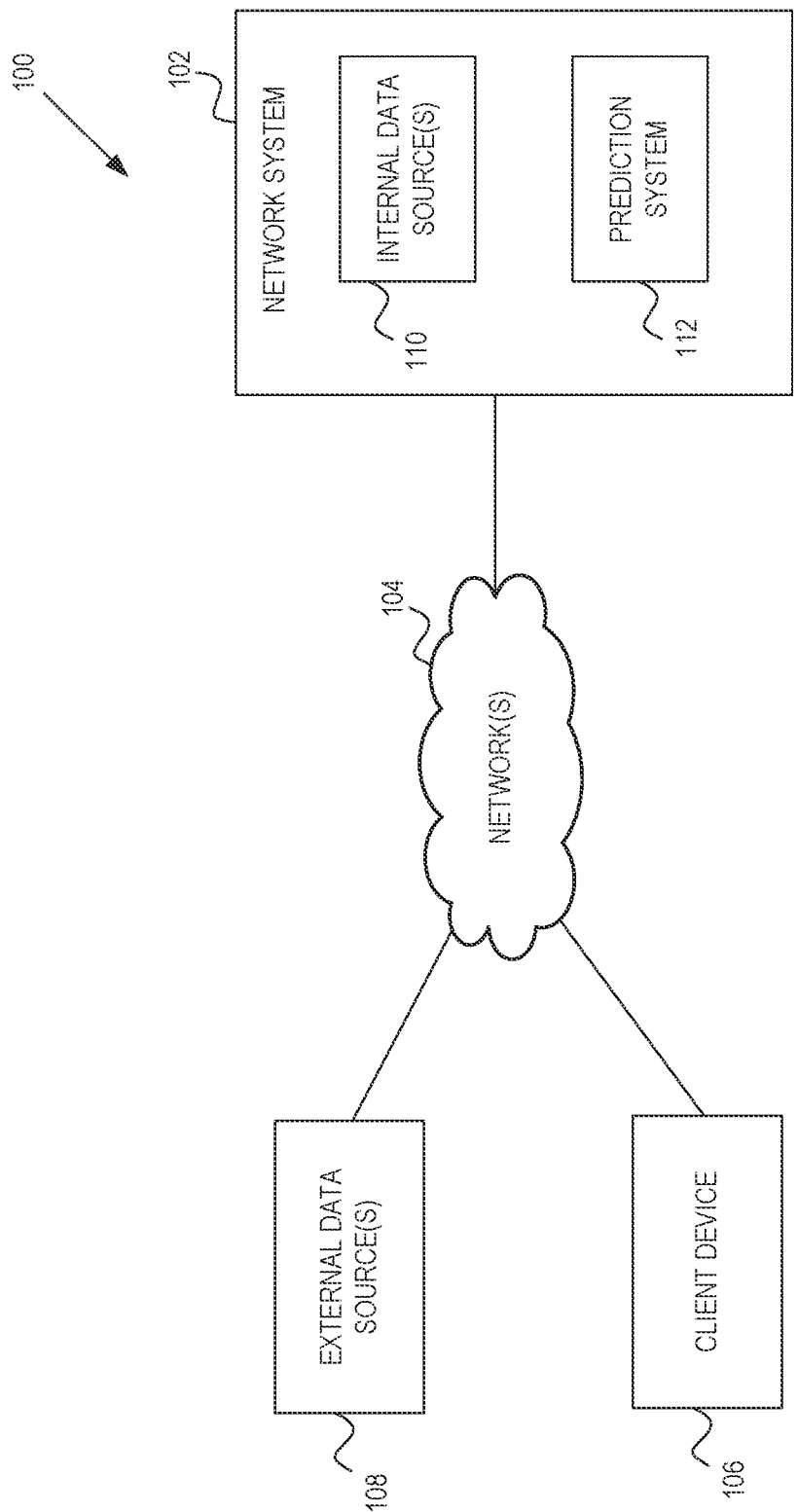
FIG. 1 is a diagram illustrating an example network environment suitable for predicting temporal startup measurements based on machine learning, according to example embodiments.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Systems and methods that machine-train (i.e., using machine-learning) a temporal prediction model and apply the temporal prediction model to predict temporal measurements related to a company's ability to succeed are discussed herein. Given a fixed window of previous event(s), times and features, the temporal prediction model predicts a next event that is likely to occur and a time for the next event. The events can include funding events (e.g., seed, series round), an exit event (e.g., acquisition or IPO), or a closure event (e.g., closes operations). For example and given features unique to a startup, if the startup is in a seed round, will the next event be an A round, close, or acquisition and when will the next event likely occur? In some embodiments, the prediction of the next event is based on a likelihood (e.g., probability) of the startup hitting certain events and time to these events as defined by a number of months expected to reach some milestone.

The machine learning involves training on data from historical financial data (e.g., past startup data). In example embodiments, a featurizer determines (e.g., extracts, derives) company features of startups. These company features can include categories of data including funding event data, momentum metrics (e.g., gap in a metric divided by time elapsed that indicates a momentum of a company, such as, a rate at which a company acquires new funding or reaches a post valuation milestone), and derivative metrics (e.g., metrics derived from the historical financial data). These company features and marker embeddings are provided to a recurrent neural network (RNN) which provides its results to a marker prediction module and a time prediction module. As such, the output of the temporal prediction model will be a marker prediction (e.g., the next likely event) and a time prediction for when the marker prediction is likely to occur. In one embodiment, a marker or label is a funding, exit, or closure event. Thus, the temporal prediction module can predict, given new financial data, what a next funding or exit event may be and when it will likely occur. The temporal prediction model can also be updated based on new historical financial data. In some embodiments, the RNN can be a gated recurrent unit (GRU).

Thus, the present disclosure provides technical solutions that accurately predicts temporal startup measurements that indicate what the next likely event for a startup will be and when that event will occur. The technical solutions use machine-learning to train the temporal prediction model that, at runtime, predicts the next event and time of the next event. As such, example embodiments will assist users in making more informed investment decisions based on unbiased data, gives investors insight into when funding events may occur so they can plan accordingly, and highlight or visual trends that can be used as inputs into investment strategy and deal sourcing. Additionally, the temporal prediction model can be used to scan a batch of new investment data to identify companies that may not be on the radar but that have high probability of success. Thus, example embodiments provide a quantitative, machine-learning (ML) driven way to predict a startup's likelihood of success.

FIG. 1 is a diagram illustrating an example network environment 100 suitable for predicting temporal startup measurements based on machine-learning, according to example embodiments. A network system 102 provides server-side functionality via a communication network 104 (e.g., the Internet, wireless network, cellular network, or a Wide Area Network (WAN)) to a client device 106. The network system 102 machine-trains a temporal prediction model based on historical company data (e.g., historical financial data, publicly available data, internal data) obtained from one or more external data sources 108 and/or internal data sources 110. During runtime, the network system 102 applies new company data to the temporal prediction model to predict a next event and time of the next event for one or more startups (referred to interchangeably as "companies"). The machine training and prediction analysis is performed by a prediction system 112, which will be discussed in more detail in connection with FIG. 2 below.

In various cases, the client device 106 is a device associated with a user that uses the network system 102 to identify or predict startup opportunities. The client device 106 interfaces with the network system 102 via a connection with the network 104. Depending on the form of the client device 106 and seller device 108, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 104 is a Wireless Fidelity (Wi-Fi, IEEE 802.11x type) connection, a Worldwide Interoperability for Microwave Access (WiMAX) connection, or another type of wireless data connection. In such an example, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The client device 106 may comprise, but is not limited to, a smartphone, tablet, laptop, multi-processor systems, microprocessor-based or programmable consumer electronics, game consoles, set-top boxes, a server, or any other communication device that can access the network system 102. The client device 106 may comprise a display module (not shown) to display information (e.g., in the form of user interfaces). The client device 106 can be operated by a human user and/or a machine user.

The external data source 108 comprises one or more servers of an entity not under the direct control of the network system 102 that provides external data regarding past deals for analysis. In example embodiments, the external source system 108 aggregates company information for one or more startups. The aggregated information can be provided (e.g., via the network 104) to the network system 102 as raw data. The raw data can include, for example, a row of information for each company whereby each row includes company name, amount of money invested, number of investors, identity of investors, technology area, time of events (e.g., series A, series B, seed, close, acquisition), and so forth. In one embodiment, the raw data is received in a comma-separated values (CSV) file. In an alternative embodiment, the external data can be sent to the network system 102 via a feed.

The network system 102 may also comprise one or more internal data sources 110. The internal data sources 110 are components (e.g., servers, applications, entities) that are associated with or controlled by a network system entity that also controls the prediction system 112. For example, the internal data source 110 can be a search engine of the network system 102 that can provide data regarding number of searches (and thus popularity) for various companies. In another example, the internal data source 110 can be a professional social network that includes a job posting functionality. In this example, the internal data source 110 can provide data regarding a number and types of job openings (which can indicate growth at the company) and interest in the job openings (another popularity indicator). The internal data source 110 may also provide data regarding other types of social media metrics. In an alternative embodiment, one or more of the internal data sources 110 may be an external source system 108 and vice-versa.

Any of the systems, servers, data sources, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Functionalities of one system may, in alternative examples, be embodied in a different system. Additionally, any number of client devices 106, external data sources 108, or internal data sources 110 may be embodied within the network environment 100. While only a single network system 102 is shown, alternatively, more than one network system 102 can be included (e.g., localized to a particular region).

Figure 2:
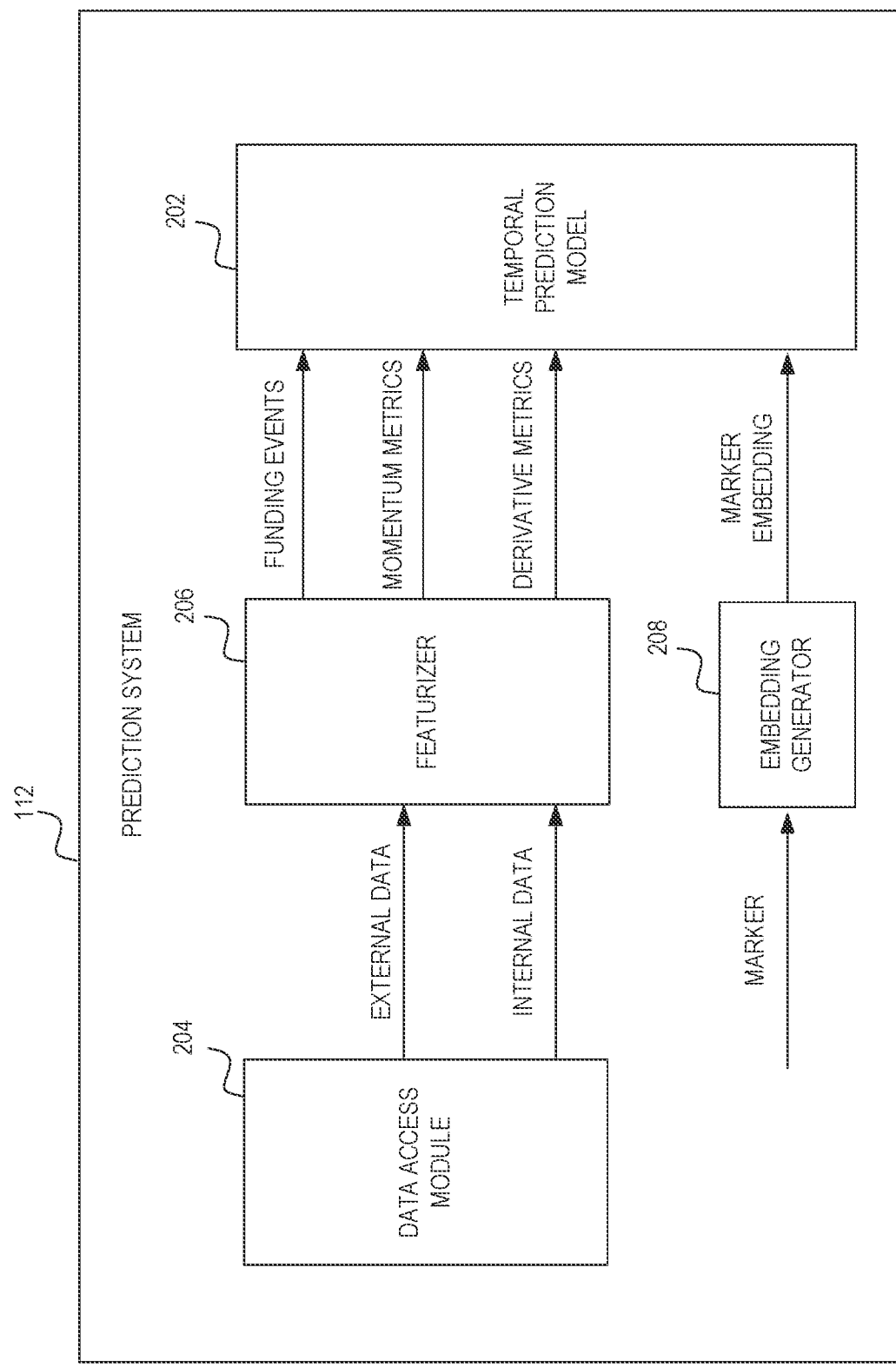
FIG. 2 is a diagram illustrating components of a prediction system, according to example embodiments.

FIG. 2 is a is a diagram illustrating components of the prediction system 112, according to example embodiments. The prediction system 112 is configured to train a temporal prediction model 202. During runtime, the prediction system 112 uses the temporary prediction model 202 to predict a next event and time of the next event for one or more startups. To enable these operations, the prediction system 112 includes a data access module 204, a featurizer 206, and an embedding generator 208 that, together, provides training data to train the temporal prediction module 202 during the machine-learning phase and provides new data that gets applied to the temporal prediction module 202 during runtime.

In example embodiments, the prediction system 112 trains the temporal prediction model 202 using training data derived, in part, from historical financial data. The historical financial data includes companies having reached different events and times of those events. The events include funding events (e.g., seed, series A, series B), exit events (e.g., IPO, merger, acquisition), and a closure event. For a fixed window of previous events, times, and features, the temporal prediction model 202 is trained to predict the next event and time of the next event.

As such, the access module 204 accesses (e.g., from a data storage) historical financial data (e.g., past investment data). The accessed data can include raw data regarding past deals aggregated by the external data source 108. The raw data can include, for example, a row of information for each company including a company name, amount of money invested, number of investors, identity of investors, technology area, time of events (e.g., series A, series B, seed, close, acquisition), and so forth. In one embodiment, the raw data is received in a comma-separated values (CSV) file.

The access module 204 may also access data from the internal data sources 110. If the internal data source 110 comprises a search engine, the data includes metrics related to amount of company or product queries. Alternatively, if the internal data source 110 is a professional social network that includes a job posting functionality, the data can include metrics on number of job postings and message counts associated with interest in the job postings. Further still, if the internal data source 110 comprises a cloud computing service or platform, the data can include usage data.

The external and/or internal data is then transmitted to the featurizer 206 which determines (e.g., extracts, derives, computes) company features for the training data (also referred to as "training set") that will be used to train the temporal prediction module 202. In one embodiment, a manually defined list of company features can be created and the featurizer 206 computes the manually defined list of company features based on the accessed data. Based on the historical financial data, the training set can be created by identifying companies that jumped from one stage to another (e.g., seed to series A, seed to closed, series A to series B) and also by computing a time elapsed between these transitions. The company features can include categories of data including funding event data, momentum metrics, and derivative metrics. The funding event data can be determined from the historical financial data and can include, for example, a type of funding event, an amount of each funding event, and timing of each funding event for companies that had, in the past, reached a given valuation state, exited, or closed.

For the companies in the training set, the momentum metrics can be determined, for example, from the search engine data, professional social network data, and/or the cloud computing platform data for these companies. The momentum metrics can indicate momentum each company has based on interest and growth indicators. For example, the interest and growth indicators can be determined from public interest (e.g., based on number of searches), employee count and growth (e.g., based on number of job postings), public relations (PR) announcements, social network postings, and/or computing resource/usage (e.g., from the computing platform data).

For the companies in the training set, the derivative metrics can be derived by the featurizer 206 from the external data and/or the internal data associated with these companies. For example, given the historical financial data, the featurizer 206 can perform derivative calculations to determine what is the funding growth over time (referred to as a "funding velocity") for a company. For instance, if company X received $A in a funding round at time T1 and $B at a later funding round at time T2, the funding velocity is then defined as (B−A)/(T2−T1). A higher funding velocity is a desirable trait, and a negative or small funding velocity is likely a sign of growth impediment. Other derivative metrics can be derived by the featurizer 206 and different derivative metrics can be derived based on, for example, the event type(s) for which the temporal prediction model 202 is being trained. For instance, the featurizer 206 can device a post valuation velocity (e.g., different in post evaluation compared to a previous round divided by time elapsed).

The embedding generator 208 comprises an embedding layer. In example embodiments, the embedding generator 208 receives an indication of one or more markers or labels and generates a marker embedding based on the one or more markers. In example embodiments, the indication of the one or more markers or labels indicating the result that a user is interested (e.g., events) are set, for example, by the user (e.g., of the client device 206). Here, the markers are for funding, exit, or closure events (e.g., seed, series A, series B, series C, closed). The embedding generator 208 converts a discrete representation of the markers or event labels (e.g., seed, series A, series B, series C, closed) into a continuous representation.

The training data from the featurizer 206 and the marker embedding from the embedding generator 208 are then used to train the temporal prediction model 202. The training data is also referred to as "company features." The training process will be discussed in more detail in connection with FIG. 3 below.

During runtime, a similar process is performed by the prediction system 112 but with a different set of data. That is, new data associated with potential startups opportunities (instead of historical financial data) is accessed by the data access module 204 and provided to the featurizer 206. The same types of data are determined by the featurizer 206 (e.g., known funding event data, momentum metrics, and derivative metrics). These company features are then applied to the temporal prediction model 202 to predict a next event and a time of the next event for one or more companies as is discussed further below.

Figure 3:
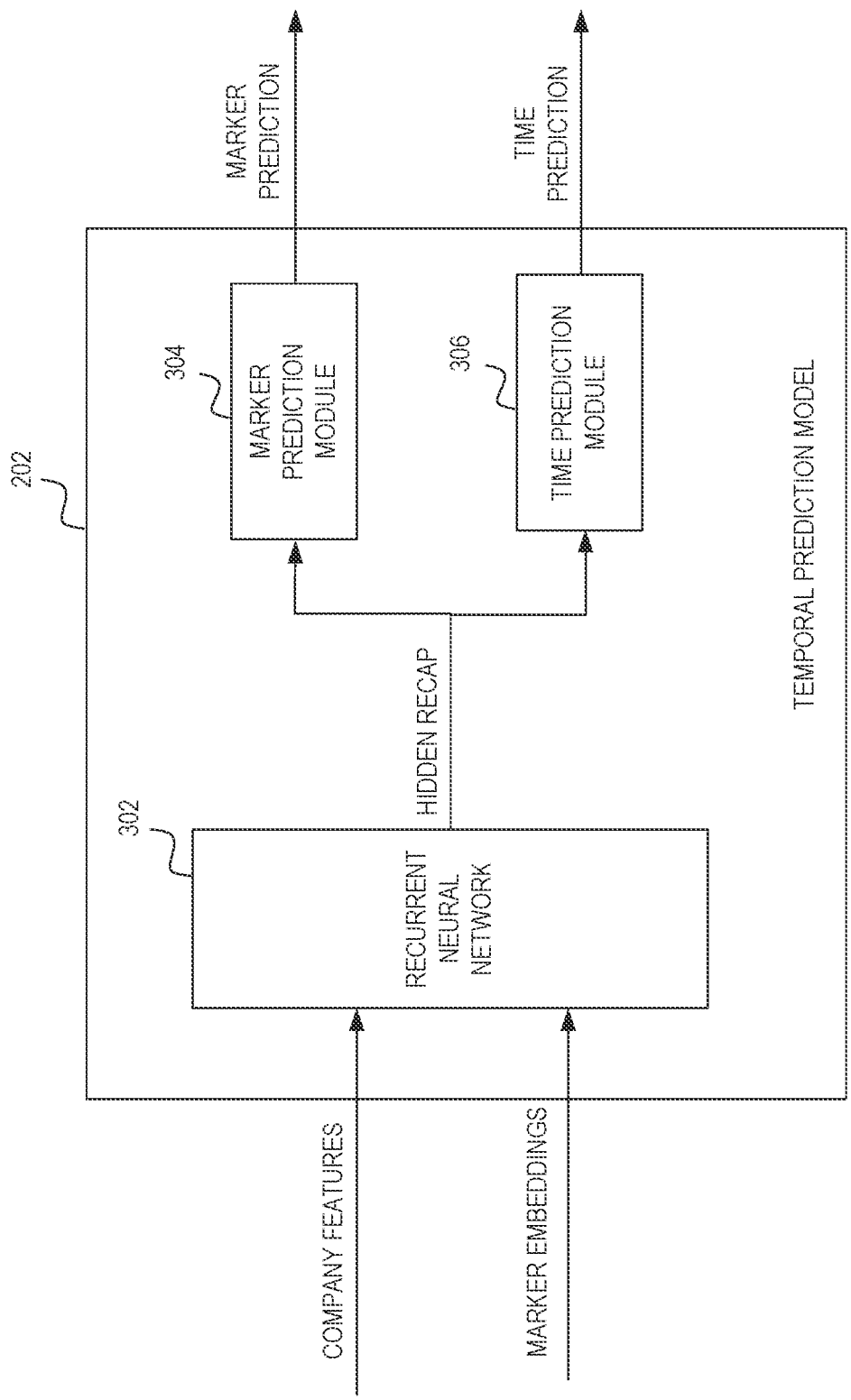
FIG. 3 is a diagram illustrating a temporal prediction model flow, according to example embodiments.

FIG. 3 is a diagram illustrating a temporal prediction model flow, according to example embodiments. The flow illustrates the various data and components that are involved in the event and time prediction. In an input layer, company features and marker embeddings are provided to the temporal prediction model 202. In example embodiments, markers or labels indicating the events are set, for example, by a user (e.g., of the client device 206). In example embodiments, the markers are for funding, exit, or closure events (e.g., seed, A, B, C, closed). The markers may be applied to an embedding layer that converts a discrete representation of the markers (e.g., seed, A, B, C, closed) into a continuous representation.

In example embodiments, the company features and the marker embeddings are concatenated together and fed into a recurring neural network (RNN) in a recurrent layer. In one embodiment, the RNN 302 is a gated recurrent unit (GRU). In example embodiments, the RNN 302 predicts two things. The first is a traditional multi-class label which indicates what is the next event that will happen and the second is time. As such, the output layer comprises a marker prediction module 304 (e.g., a multi-layer perceptron that can predict the next event) and a time prediction module 306 that are trained to provide a marker prediction and a time prediction in parallel. Specifically, the RNN 302 maps the event label and the timing information (included in the set of company features) to a hidden representation which is then used as a feature to the marker prediction module 304 and the time prediction module 306. The joint learning between the event and time information is made possible by the common hidden representation being fed to the marker prediction module 304 and the time prediction module 306.

While example embodiments show a recurrent neural network, alternative embodiments can use other forms of machine learning such as linear regression, logistic regression, a decision tree, k-nearest neighbors, and/or k-means, to name a few examples.

Because the historical financial data includes the timing of all known events, the performance of the temporal prediction model 202 can be compared to the known results to check for accuracy. As time passes, the past investment data set will get larger and continuous back testing can be performed. Additionally, new features can be created based on the testing. As new historical financial data is received, the temporal prediction model 202 may be retrain with the new past investment data to improve its accuracy.

Figure 4:
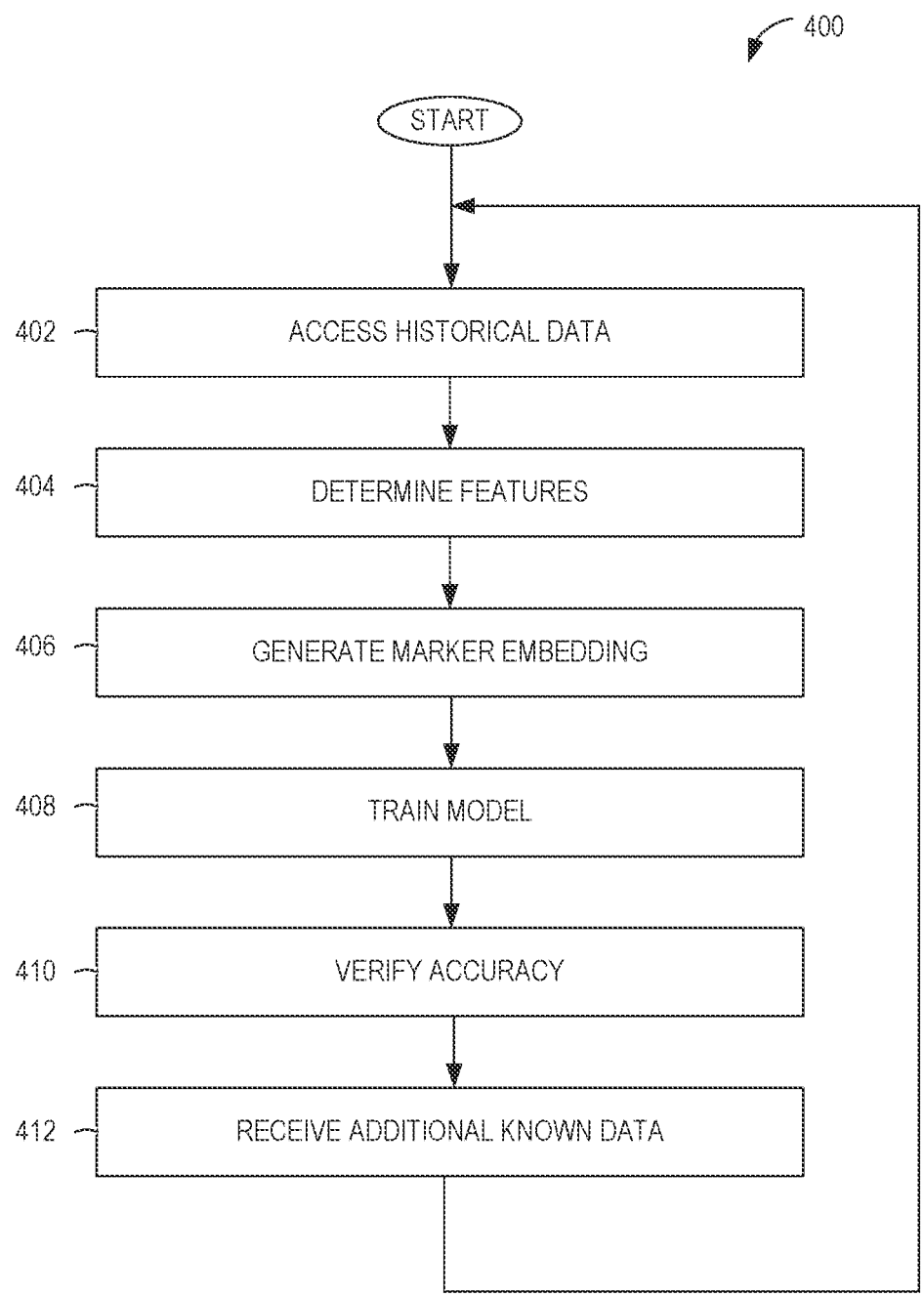
FIG. 4 is a flowchart illustrating operations of a method for machine training a temporal prediction model, according to example embodiments.

FIG. 4 is a flowchart illustrating operations of an example method 400 for machine-training a temporal prediction model, according to example embodiments. Operations in the method 400 may be performed by the prediction system 112, using components described above with respect to FIG. 2 and FIG. 3. Accordingly, the method 400 is described by way of example with reference to the prediction system 112. However, it shall be appreciated that at least some of the operations of the method 400 may be deployed on various other hardware configurations or be performed by similar components residing elsewhere in the network environment 100. Therefore, the method 400 is not intended to be limited to the prediction system 112.

In operation 402, the prediction system 112 (e.g., the data access module 204) accesses external data (e.g., historical financial data) and, if available, internal data. The historical financial data can include raw data organized as rows of information with each row being for a particular company. Each row can include, for example, a company name, amount of money invested, number of investors, identity of investors, technology area, types of events (e.g., seed, series A, series B, series C, close, acquisition), time of the events, and so forth. In one embodiment, the raw data is received in a comma-separated values (CSV) file.

In operation 404, the featurizer 206 determines (e.g., computes, derives) company features to be used to train the temporal prediction model 202 (e.g., computes manually defined company features). The company features can include categories of data including funding event data, momentum metrics, and derivative metrics. The featurizer 206 can determine the funding event data from the accessed data from operation 402 (e.g., the historical financial data). The funding event data can include, for example, a type of each funding event, an amount of each funding event, and timing of each funding event for companies that had, in the past, reached a given valuation state, exited, or closed.

For these companies, the featurizer 206 can determine momentum metrics that indicate, for example, a direction that a company is headed. The momentum metrics can be based on, for example, public interest (e.g., based on number of searches), employee count growth (e.g., based on number of job postings), public relations (PR) announcements, and/or computing resource/usage (e.g., from the computing platform data).

Finally, the featurizer 206 can perform derivative calculations to determine, in one example, what is the funding growth over time (referred to as a "funding velocity") for a company and how this funding velocity compares to other companies in a same vertical. Other derivative metrics can be derived by the featurizer 206, and different derivative metrics can be derived based on, for example, the event type(s) for which the temporal prediction model 202 is being trained.

In operation 406, the embedding generator 208 generates a marker embedding. In example embodiments, one or more markers or labels indicating the events that a user is interested are received from the user. In one embodiment, the markers are for funding, exit, or closure events (e.g., seed, series A, series B, series C, acquisition, closed). The embedding generator 208 converts a discrete representation of the markers into a continuous representation (e.g., the marker embedding).

In operation 408, the temporal prediction model 202 is trained. In example cases, the determined company features from operation 404 and the marker embedding from operation 406 are concatenated together and fed into a recurring neural network (RNN). In one embodiment, the output layer comprises a marker prediction module 304 (e.g., a multi-layer perceptron that can predict the next event) and a time prediction module 306 that are trained to provide a marker prediction and a time prediction in parallel. The joint learning between the event and time information is made possible by the common hidden representation being fed to the marker prediction module 304 and the time prediction module 306.

In operation 410, the accuracy of the temporal prediction model 202 can be verified using the historical financial data. Because the historical financial data includes indications of the funding, exit, and closure events and the timing of these events, the historical financial data can be applied to the trained temporal prediction model 202 to determine the accuracy. Additionally, one or more company features can be changed (e.g., new company features created, existing company feature removed) in order to tweak the temporal prediction model and improve the accuracy based on the testing/verification. For instance, a new company feature can be created based on new data. For example, if a number of job postings for a company over time is known, a new feature describing the rate at which job creation is happening at a startup can be added since this can be a predictor of how well the company is doing. Operation 410 can be optional in some embodiments.

In operation 412, new historical financial data is received over time. The new historical financial data may be stored to a data storage and subsequently used to retrain/refine the temporal prediction model 202. Thus, operations 402 to 410 of the method 400 can be periodically repeated.

Figure 5:
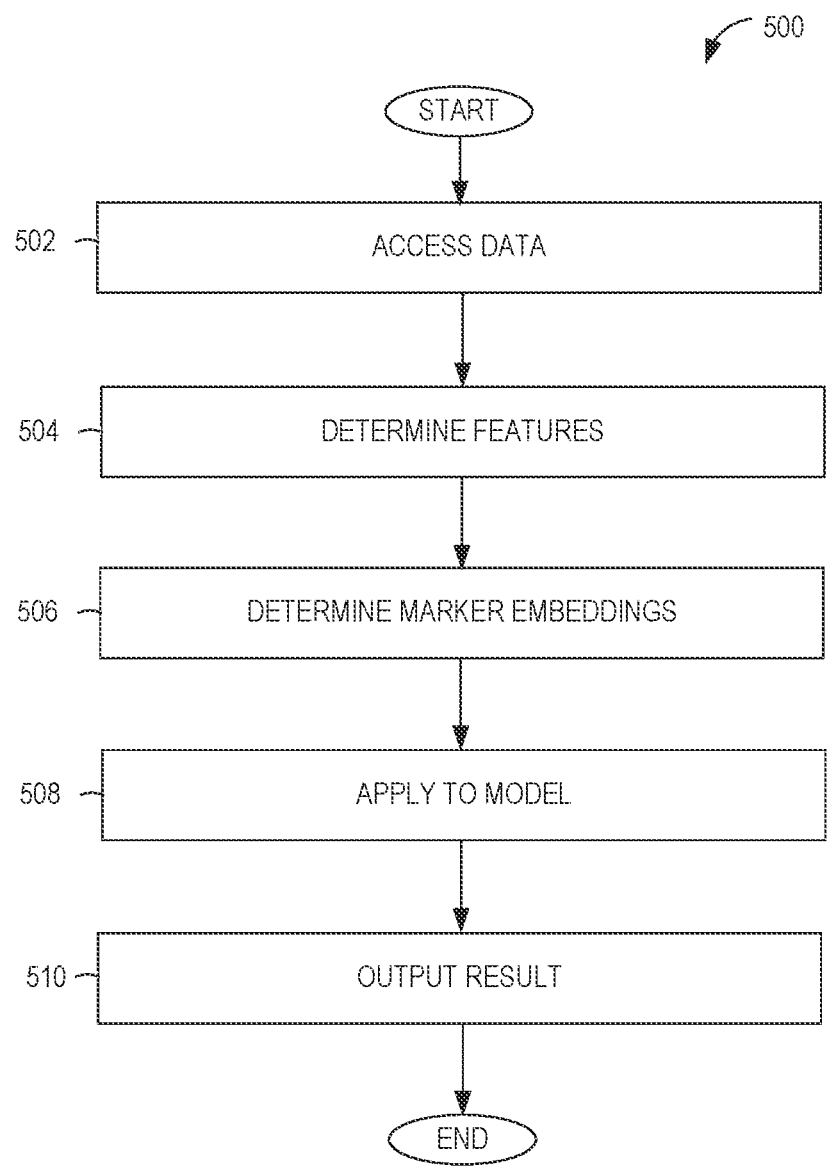
FIG. 5 is a flowchart illustrating operations of a method for performing machine learning-based temporal startup prediction, according to example embodiments.

FIG. 5 is a flowchart illustrating operations of a method 500 for performing machine learning-based temporal startup prediction, according to example embodiments. Operations in the method 500 may be performed by the prediction system 112, using components described above with respect to FIG. 2 and FIG. 3. Accordingly, the method 500 is described by way of example with reference to the prediction system 112. However, it shall be appreciated that at least some of the operations of the method 500 may be deployed on various other hardware configurations or be performed by similar components residing elsewhere in the network environment 100. Therefore, the method 500 is not intended to be limited to the prediction system 112.

In operation 502, the prediction system 112 (e.g., the data access module 204) accesses data for potential startups opportunities. The accessed data can comprise a batch of data that includes raw data organized as rows of information with each row being for a particular company. The rows can include, for example, a company name, amount of money invested, number of investors, identity of investors, technology area, types of events (e.g., seed, series A, series B, series C, close, acquisition), time of the events, and so forth. In one embodiment, the raw data is received in a comma-separated values (CSV) file. The accessed data can also include internal data, data obtained from a search engine, data obtained social network, or data obtained from a cloud computing platform.

In operation 504, the featurizer 206 determines (e.g., computes, derives, identifies) company features to be used in the analysis. In one embodiment, the featurizer 206 computes manually defined company features from the accessed data. The company features can include funding event data, momentum metrics, and derivative metrics determined by the featurizer 206. For funding event data, the featurizer 206 can identify, for each startup, what their current funding state is, when that funding state occurred, an amount of the current funding state, and so forth. If there are previous funding states, then those states and timing of those states may also be identified.

For these companies, the featurizer 206 also determines momentum metrics. The momentum metrics can indicate momentum each company has based on, for example, public interest (e.g., based on number of searches), employee count and growth (e.g., based on number of job postings), public relations (PR) announcements, and/or computing resource/usage (e.g., from the computing platform data).

Finally, the featurizer 206 can perform derivative calculations using the accessed data to determine one or more derivative metrics. In one example, the derivative metrics include a funding velocity (e.g., what is the funding growth over time) for each startup and/or how this funding velocity compares to other companies in a same vertical.

In operation 506, the embedding generator 208 generates a marker embedding. In example embodiments, one or more markers or labels indicating the events that a user is interested are received from the user. In one embodiment, the markers are for funding, exit, or closure events (e.g., seed, series A, series B, series C, closed). The embedding generator 208 converts a discrete representation of the markers (e.g., seed, series A, series B, series C, closed) into a continuous representation (e.g., the marker embedding).

In operation 508, the determined company features from operation 504 and the marker embedding from operation 506 are provided to the temporal prediction model 202. In example embodiments, the company features for the startups that may be new investment opportunities and the marker embeddings are concatenated together and fed into the RNN 302. The RNN 302 maps the event label and the timing information to a hidden representation which is then used as a feature to the marker prediction module 304 and the time prediction module 306. Subsequently, the marker prediction module 304 and the time prediction module 306 substantially simultaneously predict a next event (i.e., marker prediction) and a time of the next event (i.e., time prediction) for one or more startups.

In operation 510, the results are output to the user. In one embodiment, the next event and the time of the next event for each startup can be displayed on a dashboard user interface (UI). Because a batch of new startup opportunity data can be run at one time, the dashboard UI can comprise a column of a plurality of companies. For example, the dashboard UI can display for each company, a row of information including their current funding round, success indicators (e.g., probabilities for different events or investment amount for different events), and timing of the next event(s). The dashboard UI can provide filter selections to filter, for example, by verticals, countries, or company name.

Figure 6:
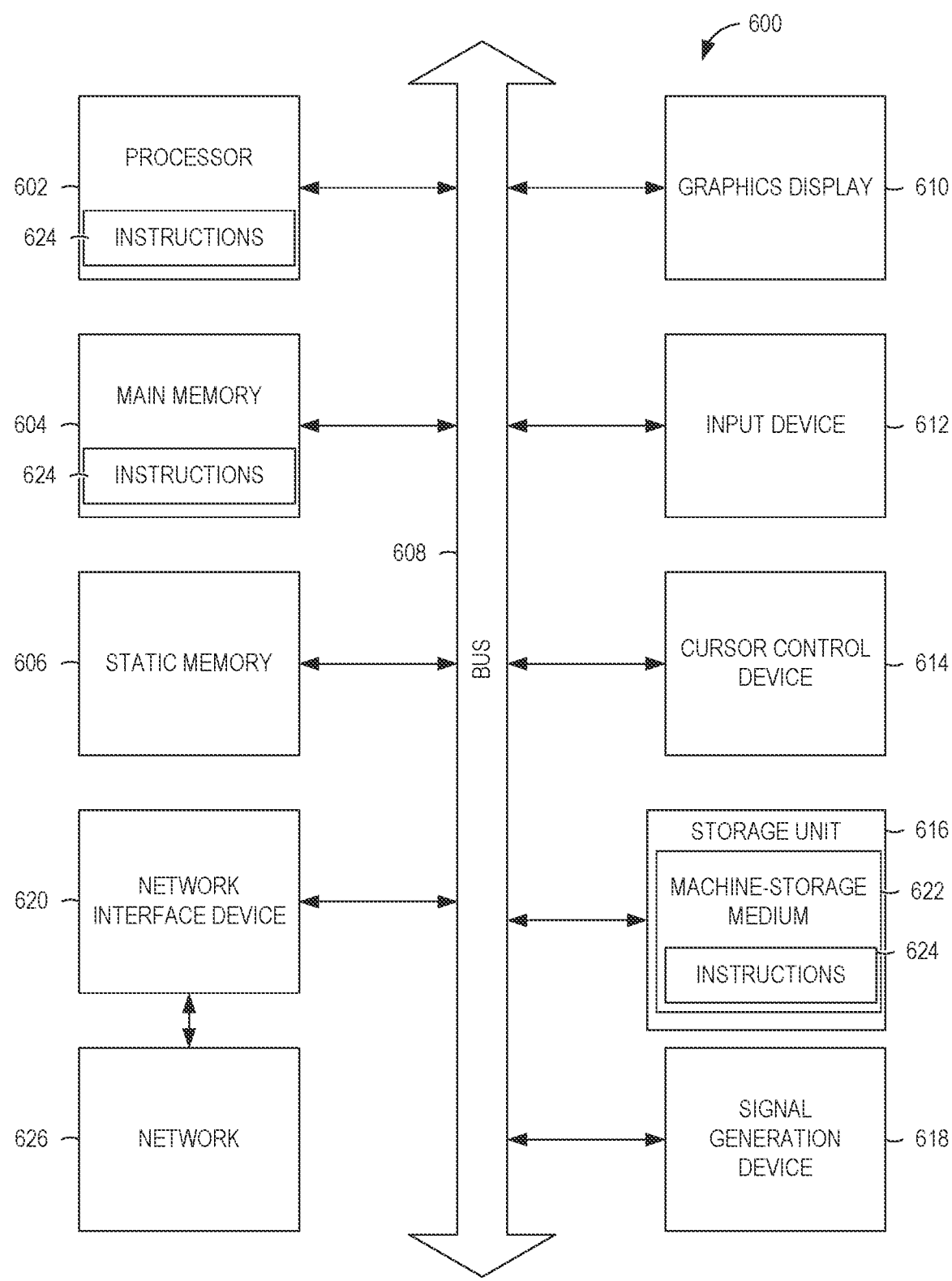
FIG. 6 is a block diagram illustrating components of a machine, according to some examples, able to read instructions from a machine-storage medium and perform any one or more of the methodologies discussed herein.

FIG. 6 illustrates components of a machine 600, according to some examples that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIG. 4 and FIG. 5. In one example, the instructions 624 can transform the general, non-programmed machine 600 into a particular machine (e.g., specially configured machine) programmed to carry out the described and illustrated functions in the manner described.

In alternative examples, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with one another via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-readable media (e.g., tangible and non-transitory machine-readable media). The instructions 624 may be transmitted or received over a network 626 via the network interface device 620.

In some examples, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processors) 602 cause various operations to implement the disclosed examples.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The terms "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain examples are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various examples, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some examples, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering examples in which hardware modules are temporarily configured (e.g., programmed), the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In examples in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some examples, the one or more processors or processor-implemented modules may be located in a single geographic location (e.g., within a home environment, an office environment, or a server farm). In other examples, the one or more processors or processor-implemented modules may be distributed across a number of geographic locations.

EXAMPLES

Example 1 is a method for predicting temporal startup measurements. The method comprises determining a training dataset of features associated with different funding, exit, and closure events and corresponding times of the funding, exit, and closure events from historical financial data; training a temporal prediction model using the training dataset, the temporal prediction model comprising a recurrent neural network; during runtime, accessing new data associated with potential future investment opportunities with startups; determining company features based, in part, on the new data; applying the company features to the temporal prediction model to simultaneously predict a next event and a time of the next event for each startup; and causing presentation of a user interface that presents the predicted next event and the predicted time of the predicted next event for each startup.

In example 2, the subject matter of example 1 can optionally include wherein the new data comprises a batch of data in a comma-separated values (CSV) file format; and the determining the company features comprises feeding the batch of data through a featurizer that determines the company features.

In example 3, the subject matter of any of examples 1-2 can optionally include wherein determining the company features comprises determining funding event data from the new data for each startup, the funding event data including a current funding event, any previous funding events, and time of each funding event.

In example 4, the subject matter of any of examples 1-3 can optionally include wherein determining the company features comprises determining one or more momentum metrics for each startup, the one or more momentum metrics indicating momentum for each startup based on interest and growth indicators.

In example 5, the subject matter of any of examples 1-4 can optionally include wherein determining the company features comprises determining, by a featurizer, one or more derivative metrics for each startup by performing a derivative calculation using the new data.

In example 6, the subject matter of any of examples 1-5 can optionally include wherein the one or more derivative metrics includes a funding velocity.

In example 7, the subject matter of any of examples 1-6 can optionally include generating a marker embedding from one or more markers indicating one or more events to be predicted by the temporal prediction model; and concatenating the marker embedding with the company features prior to applying the company features to the temporal prediction model.

In example 8, the subject matter of any of examples 1-7 can optionally include wherein the temporal prediction model comprises a marker prediction module to predict the next event and a time prediction module to predict the time of the next event.

In example 9, the subject matter of any of examples 1-8 can optionally include wherein the causing presentation of the user interface comprises causing presentation of a dashboard user interface that comprises a plurality of rows, each row indicating a startup name, a current funding event, the predicted next event, and the time of the next event.

In example 10, the subject matter of any of examples 1-9 can optionally include verifying accuracy of the temporal prediction model using the historical financial data.

In example 11, the subject matter of any of examples 1-10 can optionally include receiving new historical financial data; and retraining the temporal prediction model using the new historical financial data.

In example 12, the subject matter of any of examples 1-11 can optionally include wherein the new data includes, for each startup, one or more of an amount of company queries, an amount of product queries, a number of job postings, message counts associated with interest in the job postings, or usage data on a cloud computing platform.

In example 13, the subject matter of any of examples 1-12 can optionally include wherein determining the company features comprises computing manually defined company features.

In example 14, the subject matter of any of examples 1-13 can optionally include wherein the recurrent neural network comprises a gated recurrent unit.

Example 15 is a system for predicting temporal startup measurements. The system comprises one or more hardware processors and a memory storing instructions that, when executed by the one or more hardware processors, cause the one or more hardware processors to perform operations comprising determining a training dataset of features associated with different funding, exit, and closure events and corresponding times of the funding, exit, and closure events from historical financial data; training a temporal prediction model using the training dataset, the temporal prediction model comprising a recurrent neural network; during runtime, accessing new data associated with potential future investment opportunities with startups; determining company features based, in part, on the new data; applying the company features to the temporal prediction model to simultaneously predict a next event and a time of the next event for each startup; and causing presentation of a user interface that presents the predicted next event and the predicted time of the predicted next event for each startup.

In example 16, the subject matter of example 15 can optionally include wherein the new data comprises a batch of data in a comma-separated values (CSV) file format; and the determining the company features comprises feeding the batch of data through a featurizer that determines the company features.

In example 17, the subject matter of any of examples 15-16 can optionally include wherein determining the company features comprises determining funding event data from the new data for each startup, the funding event data including a current funding event, any previous funding events, and time of each funding event.

In example 18, the subject matter of any of examples 15-17 can optionally include wherein determining the company features comprises determining one or more momentum metrics for each startup, the one or more momentum metrics indicating momentum for each startup based on interest and growth indicators; or determining, by a featurizer, one or more derivative metrics for each startup by performing a derivative calculation using the new data.

In example 19, the subject matter of any of examples 15-18 can optionally include wherein the operations further comprise generating a marker embedding from one or more markers indicating one or more events to be predicted by the temporal prediction model; and concatenating the marker embedding with the company features prior to applying the company features to the temporal prediction model Example 20 is a computer-storage medium comprising instructions which, when executed by one or more hardware processors of a machine, cause the machine to perform operations for predicting temporal startup measurements. The operations comprise determining a training dataset of features associated with different funding, exit, and closure events and corresponding times of the funding, exit, and closure events from historical financial data; training a temporal prediction model using the training dataset, the temporal prediction model comprising a recurrent neural network; during runtime, accessing new data associated with potential future investment opportunities with startups; determining company features based, in part, on the new data; applying the company features to the temporal prediction model to simultaneously predict a next event and a time of the next event for each startup; and causing presentation of a user interface that presents the predicted next event and the predicted time of the predicted next event for each startup.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a nonexclusive "or," unless specifically stated otherwise.

Although an overview of the present subject matter has been described with reference to specific examples, various modifications and changes may be made to these examples without departing from the broader scope of examples of the present invention. For instance, various examples or features thereof may be mixed and matched or made optional by a person of ordinary skill in the art. Such examples of the present subject matter may be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present invention as represented by the appended claims. The specification and drawings are, accordingly, to be regarded in an illustrative rather than a restrictive sense.

What is claimed is:

1. A method comprising:
    determining a training dataset of features associated with different funding, exit, and closure events and corresponding times of the funding, exit, and closure events from historical financial data;
    training a temporal prediction model using the training dataset, the temporal prediction model comprising a recurrent neural network that is a gated recurrent unit, a marker prediction module to predict a next event, and a time prediction module to predict a time of the next event;
    during runtime, accessing new data associated with potential future investment opportunities with startups;
    determining company features based, in part, on the new data;
    simultaneously predicting the next event and the time of the next event for each startup by applying the company features to the temporal prediction model, the simultaneously predicting comprising:
    mapping event labels and timing information included in the company features to a hidden representation by the recurrent neural network; and
    using the hidden representation as a feature by the marker prediction module to predict the next event and by the time prediction module to predict the time of the next event for each startup; and
    causing presentation of a user interface that presents the predicted next event and the predicted time of the predicted next event for each startup.

2. The method of claim 1, wherein:
    the new data comprises a batch of data in a comma-separated values (CSV) file format; and
    the determining the company features comprises feeding the batch of data through a featurizer that determines the company features.

3. The method of claim 1, wherein determining the company features comprises determining funding event data from the new data for each startup, the funding event data including a current funding event, any previous funding events, and time of each funding event.

4. The method of claim 1, wherein determining the company features comprises determining one or more momentum metrics for each startup, the one or more momentum metrics indicating momentum for each startup based on interest and growth indicators.

5. The method of claim 1, wherein determining the company features comprises determining, by a featurizer, one or more derivative metrics for each startup by performing a derivative calculation using the new data.

6. The method of claim 5, wherein the one or more derivative metrics includes a funding velocity.

7. The method of claim 1, further comprising:
    generating a marker embedding from one or more markers indicating one or more events to be predicted by the temporal prediction model; and
    concatenating the marker embedding with the company features prior to applying the company features to the temporal prediction model.

8. The method of claim 1, wherein the causing presentation of the user interface comprises causing presentation of a dashboard user interface that comprises a plurality of rows, each row indicating a startup name, a current funding event, the predicted next event, and the time of the next event.

9. The method of claim 1, further comprising:
    verifying accuracy of the temporal prediction model using the historical financial data.

10. The method of claim 1, further comprising:
    receiving new historical financial data; and
    retraining the temporal prediction model using the new historical financial data.

11. The method of claim 1, wherein the new data includes, for each startup, one or more of an amount of company queries, an amount of product queries, a number of job postings, message counts associated with interest in the job postings, or usage data on a cloud computing platform.

12. The method of claim 1, wherein determining the company features comprises computing manually defined company features.

13. A system comprising:
    one or more hardware processors; and
    a memory storing instructions that, when executed by the one or more hardware processors, cause the one or more hardware processors to perform operations comprising:
    determining a training dataset of features associated with different funding, exit, and closure events and corresponding times of the funding, exit, and closure events from historical financial data;
    training a temporal prediction model using the training dataset, the temporal prediction model comprising a recurrent neural network that is a gated recurrent unit, a marker prediction module to predict a next event, and a time prediction module to predict a time of the next event;
    during runtime, accessing new data associated with potential future investment opportunities with startups;
    determining company features based, in part, on the new data;
    simultaneously predicting the next event and the time of the next event for each startup by applying the company features to the temporal prediction model, the simultaneously predicting comprising:

mapping event labels and timing information included in the company features to a hidden representation by the recurrent neural network; and using the hidden representation as a feature by the marker prediction module to predict the next event and by the time prediction module to predict the time of the next event for each startup; and causing presentation of a user interface that presents the predicted next event and the predicted time of the predicted next event for each startup.

14. The system of claim 13, wherein:

the new data comprises a batch of data in a comma-separated values (CSV) file format; and the determining the company features comprises feeding the batch of data through a featurizer that determines the company features.

15. The system of claim 13, wherein determining the company features comprises determining funding event data from the new data for each startup, the funding event data including a current funding event, any previous funding events, and time of each funding event.

16. The system of claim 13, wherein determining the company features comprises:

determining one or more momentum metrics for each startup, the one or more momentum metrics indicating momentum for each startup based on interest and growth indicators; or determining, by a featurizer, one or more derivative metrics for each startup by performing a derivative calculation using the new data.

17. The system of claim 13, wherein the operations further comprise:

generating a marker embedding from one or more markers indicating one or more events to be predicted by the temporal prediction model; and concatenating the marker embedding with the company features prior to applying the company features to the temporal prediction model.

18. A non-transitory machine-storage medium comprising instructions which, when executed by one or more hardware processors of a machine, cause the machine to perform operations comprising:

determining a training dataset of features associated with different funding, exit, and closure events and corresponding times of the funding, exit, and closure events from historical financial data;

training a temporal prediction model using the training dataset, the temporal prediction model comprising a recurrent neural network that is a gated recurrent unit, a marker prediction module to predict a next event, and a time prediction module to predict a time of the next event;

during runtime, accessing new data associated with potential future investment opportunities with startups;

determining company features based, in part, on the new data;

simultaneously predicting the next event and the time of the next event for each startup by applying the company features to the temporal prediction model, the simultaneously predicting comprising:

mapping event labels and timing information included in the company features to a hidden representation by the recurrent neural network; and using the hidden representation as a feature by the marker prediction module to predict the next event and by the time prediction module to predict the time of the next event for each startup; and causing presentation of a user interface that presents the predicted next event and the predicted time of the predicted next event for each startup.

\* \* \* \* \*